US009312549B2

(12) United States Patent
Tachibana et al.

(10) Patent No.: US 9,312,549 B2
(45) Date of Patent: Apr. 12, 2016

(54) FUEL CELL COOLING SYSTEM FOR VEHICLE AND FUEL CELL-POWERED VEHICLE

(75) Inventors: Toshihide Tachibana, Shizuoka (JP); Tohru Ohta, Shizuoka (JP); Kengo Ikeya, Shizuoka (JP); Yoshimasa Matsumoto, Shizuoka (JP); Ryuhji Ohtsuka, Shizuoka (JP); Yoshifumi Takai, Shizuoka (JP); Takanori Murakami, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 145 days.

(21) Appl. No.: 14/233,952

(22) PCT Filed: Apr. 13, 2012

(86) PCT No.: PCT/JP2012/060169
§ 371 (c)(1),
(2), (4) Date: Jan. 21, 2014

(87) PCT Pub. No.: WO2013/031284
PCT Pub. Date: Mar. 7, 2013

(65) Prior Publication Data
US 2014/0186732 A1     Jul. 3, 2014

(30) Foreign Application Priority Data
Aug. 31, 2011   (JP) ................................ 2011-188237

(51) Int. Cl.
*H01M 8/04*     (2006.01)
*B60K 11/06*    (2006.01)
(Continued)

(52) U.S. Cl.
CPC ............. *H01M 8/04014* (2013.01); *B60K 1/00* (2013.01); *B60K 8/00* (2013.01); *B60K 11/06* (2013.01);
(Continued)

(58) Field of Classification Search
CPC .......... H01M 8/04014; H01M 8/0432; H01M 8/04776; H01M 8/04701; H01M 2250/20; Y02T 90/32; Y02E 60/50; B60L 1/003; B60L 11/1892; B60L 11/18; B60L 11/1898; B60L 11/1882; B60L 11/1883; B60L 11/1881; B60L 11/1896; B60K 1/00; B60K 8/00; B60K 11/06; B60K 2001/005
See application file for complete search history.

(56) References Cited

U.S. PATENT DOCUMENTS

2001/0049040 A1    12/2001   Grune et al.
2002/0162693 A1*   11/2002   Mizuno et al. ............... 180/65.1
(Continued)

FOREIGN PATENT DOCUMENTS

CN    101138115 A      3/2008
JP    H0433112 B2 *    6/1992   ............. H01M 8/02
(Continued)

OTHER PUBLICATIONS

International Search Report mailed on Jun. 19, 2012 in PCT/JP2012/060169.
(Continued)

*Primary Examiner* — Patrick Ryan
*Assistant Examiner* — Aaron Greso
(74) *Attorney, Agent, or Firm* — Rothwell, Figg, Ernst & Manbeck, P.C.

(57) ABSTRACT

The grill shutter is disposed between the front grill and the air intake duct. The grill shutter is capable of opening or closing shutter members and regulating positions of the shutter members when being opened. When a maximum supplied flow rate of air provided by the wind during running is greater than a flow rate of air required for the hydrogen fuel battery, the required flow rate of air is established only by opening/closing control of the shutter members through a grill shutter opening instruction. If this is not the case, the grill shutter members are opened fully through the grill shutter opening instruction to maximize the volume of the wind during running taken in from the front grille. Additionally, a shortfall in the required flow rate of air for the hydrogen fuel battery is compensated for by actuating the blower through a blower speed instruction.

10 Claims, 7 Drawing Sheets

(51) Int. Cl.
- *B60K 1/00* (2006.01)
- *B60L 11/18* (2006.01)
- *B60K 8/00* (2006.01)
- *B60L 1/00* (2006.01)

(52) U.S. Cl.
CPC .............. *B60L 1/003* (2013.01); *B60L 11/18* (2013.01); *B60L 11/1881* (2013.01); *B60L 11/1883* (2013.01); *B60L 11/1892* (2013.01); *B60L 11/1896* (2013.01); *B60L 11/1898* (2013.01); *H01M 8/0432* (2013.01); *H01M 8/04701* (2013.01); *H01M 8/04776* (2013.01); *B60K 2001/005* (2013.01); *H01M 2250/20* (2013.01); *Y02E 60/50* (2013.01); *Y02T 90/32* (2013.01); *Y02T 90/34* (2013.01)

(56) References Cited

U.S. PATENT DOCUMENTS

| | | | |
|---|---|---|---|
| 2008/0092832 A1 | 4/2008 | Bielesch et al. | |
| 2008/0193812 A1* | 8/2008 | Murata et al. | 429/24 |
| 2008/0226957 A1* | 9/2008 | Suematsu et al. | 429/22 |
| 2009/0133943 A1 | 5/2009 | Noguchi et al. | |

FOREIGN PATENT DOCUMENTS

| | | |
|---|---|---|
| JP | 6-28257 U | 4/1994 |
| JP | 2000-514745 A | 11/2000 |
| JP | 2004-175281 A | 6/2004 |
| JP | 2008-517195 A | 5/2008 |
| JP | 2009-126452 A | 6/2009 |
| JP | 2011-68233 A | 4/2011 |

OTHER PUBLICATIONS

Notice of Allowance mailed Aug. 18, 2015 in corresponding Japanese Patent Application No. 2011-188237(1 page).

The First Office Action mailed Aug. 31, 2015 in corresponding Chinese Patent Application No. 201280036444.X(with an English translation) (14 pages).

* cited by examiner

FUEL CELL COOLING SYSTEM FOR VEHICLE AND FUEL CELL-POWERED VEHICLE

CROSS REFERENCE TO RELATED APPLICATION

This application is a 35 U.S.C. 371 National Phase Entry Application from PCT/JP2012/060169, filed Apr. 13, 2012, which claims the benefit of Japanese Patent Application No. 2011-188237, filed Aug. 31, 2011, the disclosures of which are incorporated herein in their entirety by reference.

TECHNICAL FIELD

The present invention relates generally to a fuel cell cooling system for vehicles in which a fuel battery is mounted and a fuel cell-powered vehicle.

BACKGROUND ART

Patent document 1 discloses a vehicle equipped with air-cooled fuel cells. This technology uses the wind to which the vehicle is subjected during running to cool the fuel cells. Additionally, a separate pressure source such as a ventilating fan is prepared to cool the fuel cells. The vehicle speed is measured. When the vehicle speed is a low speed, the ventilating fan is actuated to cool the fuel cells. When an outside temperature is high, the ventilating fan is also actuated to cool the fuel cells.

PRIOR ART TECHNICAL DOCUMENT

Patent Document

Patent Document 1: Japanese Translation of PCT International Application Publication No. 2000-514745

SUMMARY OF THE INVENTION

Problem to be Solved by the Invention

However, the technology, as taught in Patent Document 1, has the problem that there is no measure for regulating the wind during running, and, thus, it is impossible to cool the fuel cells using the wind during running depending upon circumstances.

It is an object of the invention to cool a fuel cell through the wind during running depending upon circumstances.

Means for Solving the Problem (1) One aspect of the invention is a fuel cell cooling system for a vehicle which comprises a first air inlet provided in a front portion of a vehicle, an air supply path which supplies air, as taken in from said first air inlet, to a fuel cell which supplies electric power to a driving motor, a regulating member which is provided in said air supply path and regulates an amount of air to be supplied from the air supply path to said fuel cell, a blower which provides an air flow to said fuel cell, and a control portion which controls said regulating member and said blower to regulate an amount of air supplied from the air supply path and the blower to the fuel cell.

(2) Another aspect of the invention is such that, in the aspect (1), a vehicle speed detecting portion which detects a speed of the vehicle is further provided, said control portion works to derive a flow rate of air required for the fuel cell from an output of the fuel cell to control said regulating member based on the required flow rate of air and said vehicle speed, thereby regulating the amount of air supplied from the air supply path to the fuel cell, and when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air.

Another aspect of the invention is such that, in the aspect (1), a vehicle speed detecting portion which detects a vehicle speed and a temperature detecting portion which detects a temperature of the fuel cell are further provided, said control portion works to derive a flow rate of air required for the fuel cell from an output of the fuel cell to control said regulating member based on the required flow rate of air and said vehicle speed, thereby regulating the amount of air supplied from the air supply path to the fuel cell, when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air, and the control portion also control the regulating member and the blower so as to eliminate a deviation of the detected temperature from a target temperature of the fuel cell.

(4) Another aspect of the invention is such that, in the aspect (1), a second air inlet which takes air into the air supply path from beneath the vehicle, an opening/closing member which opens or closes the second air inlet, and a rain detecting portion which detects rail fall are further provided, and when the rain fall is detected by the rain detecting portion, the control portion stops supplying the air from the air supply path to the fuel cell through the regulating member and also opens the second air inlet through the opening/closing member.

(5) Another aspect of the invention is such that, in the aspect (1), when the fuel cell is shut down, the control portion stops supplying the air from the air supply path to the fuel cell through the regulating member.

(6) Another aspect of the invention is such that, in the aspect (1), a temperature detecting portion which detects a temperature of the fuel cell is further provided, and when the temperature, as detected by the temperature detecting portion, is lower than a set temperature, the control portion stops supplying the air from the air supply path to the fuel cell through the regulating member.

(7) One aspect of the invention is a fuel cell-powered vehicle which comprises a driving motor, a fuel cell which supplies electric power to the motor, a first air inlet provided in a front portion of the vehicle, an air supply path which supplies air, as taken in from said first air inlet, to the fuel cell, a regulating member which is provided in said air supply path and regulates an amount of air to be supplied from the air supply path to said fuel cell, a blower which provides an air flow to said fuel cell, and a control portion which controls said regulating member and said blower to regulate an amount of air supplied from the air supply path and the blower to the fuel cell.

(8) Another aspect of the invention is such that, in the aspect (7), a vehicle speed detecting portion which detects a speed of the vehicle is further provided, said control portion works to derive a flow rate of air required for the fuel cell from an output of the fuel cell to control said regulating member based on the required flow rate of air and said vehicle speed, thereby regulating the amount of air supplied from the air supply path to the fuel cell, and when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air.

(9) Another aspect of the invention is such that, in the aspect (7), a vehicle speed detecting portion which detects a vehicle speed and a temperature detecting portion which detects a temperature of the fuel cell are further provided, said control portion works to derive a flow rate of air required for the fuel cell from an output of the fuel cell to control said regulating member based on the required flow rate of air and said vehicle speed, thereby regulating the amount of air supplied from the air supply path to the fuel cell, when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air, and the control portion also control the regulating member and the blower so as to eliminate a deviation of the detected temperature from a target temperature of the fuel cell.

(10) Another aspect of the invention is such that, in the aspect (7), a second air inlet which takes air into the air supply path from beneath the vehicle, an opening/closing member which opens or closes the second air inlet, and a rain detecting portion which detects rail fall are further provided, and when the rain fall is detected by the rain detecting portion, the control portion stops supplying the air from the air supply path to the fuel cell through the regulating member and also opens the second air inlet through the opening/closing member.

(11) Another aspect of the invention is such that, in the aspect (7), when the fuel cell is shut down, the control portion stops supplying the air from the air supply path to the fuel cell through the regulating member.

(12) Another aspect of the invention is such that, in the aspect (7), a temperature detecting portion which detects a temperature of the fuel cell is further provided, and when the temperature, as detected by the temperature detecting portion, is lower than a set temperature, the control portion stops supplying the air from the air supply path to the fuel cell through the regulating member.

Effects of the Invention

With the aspects (1) and (7), the amount of the wind during running to be supplied to the fuel cell can be regulated by the regulating member depending upon circumstances.

With the aspects (2) and (8), the volume of air required for the fuel cell can be derived without having to use the blower, thus resulting in a decrease in consumption of electric power.

With the aspects (3) and (9), it is possible to keep the fuel cell at a temperature suitable for power generation.

With the aspects (4) and (10), the fuel cell is prevented from being splashed with drops of rain.

With the aspects (5) and (11), the intrusion of water or foreign objects into the fuel cell can be avoided after the fuel cell is shut down.

With the aspects (6) and (12), the fuel cell can be warmed up quickly.

MODE FOR CARRYING OUT THE INVENTION

One embodiment of the invention will be described below.

A fuel cell-powered vehicle of this embodiment is equipped with a motor for driving the vehicle and a fuel battery which supplies power to the motor.

Figure 1:
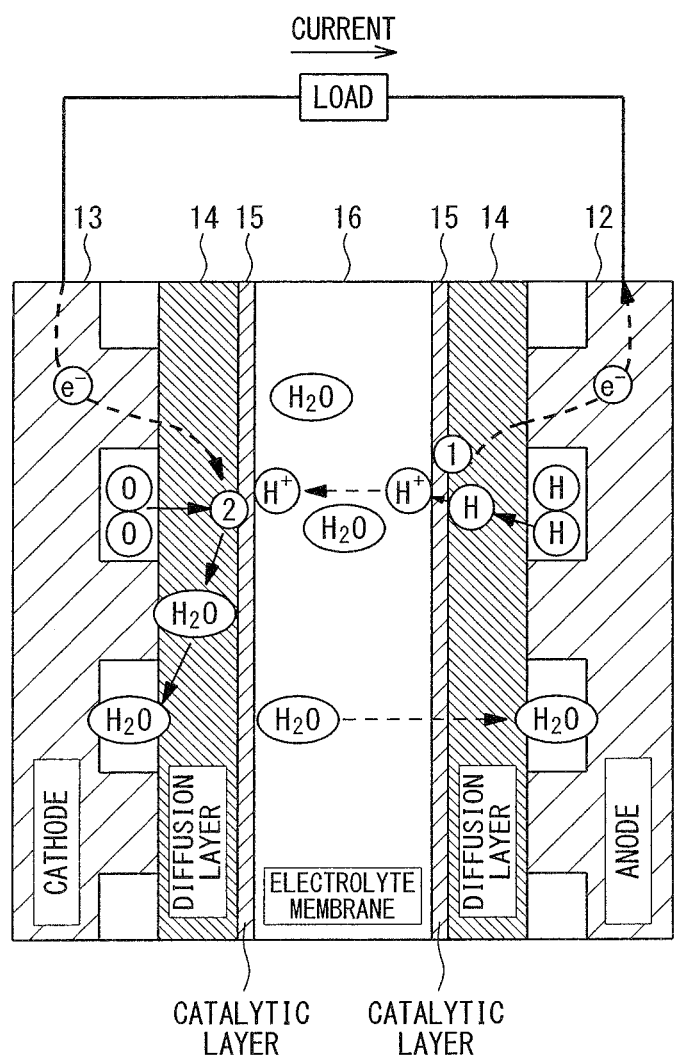
FIG. 1 is an explanatory view which explains a structure and an operation of a fuel battery mounted in a fuel cell-powered vehicle of an embodiment of the invention.
Figure 2:
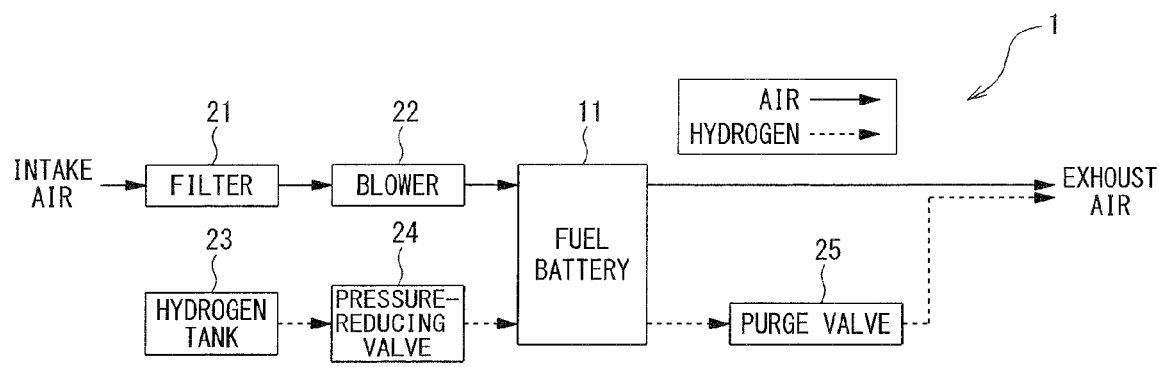
FIG. 2 is a block diagram of a system of a fuel cell-powered vehicle of an embodiment of the invention.
Figure 3:
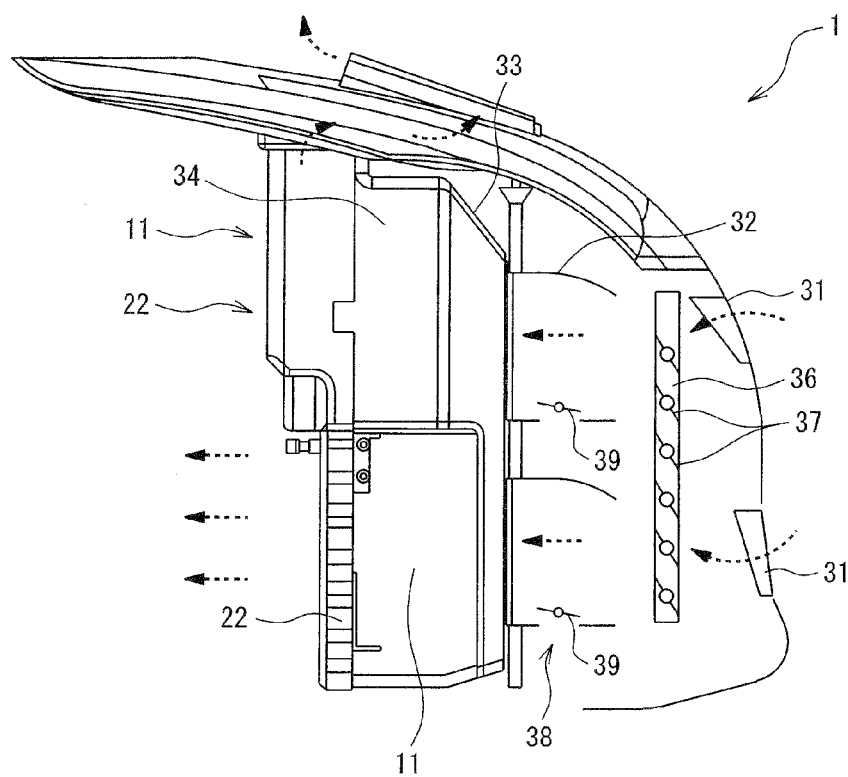
FIG. 3 is a longitudinal sectional view of a front portion of a fuel cell-powered vehicle of an embodiment of the invention.
Figure 4:
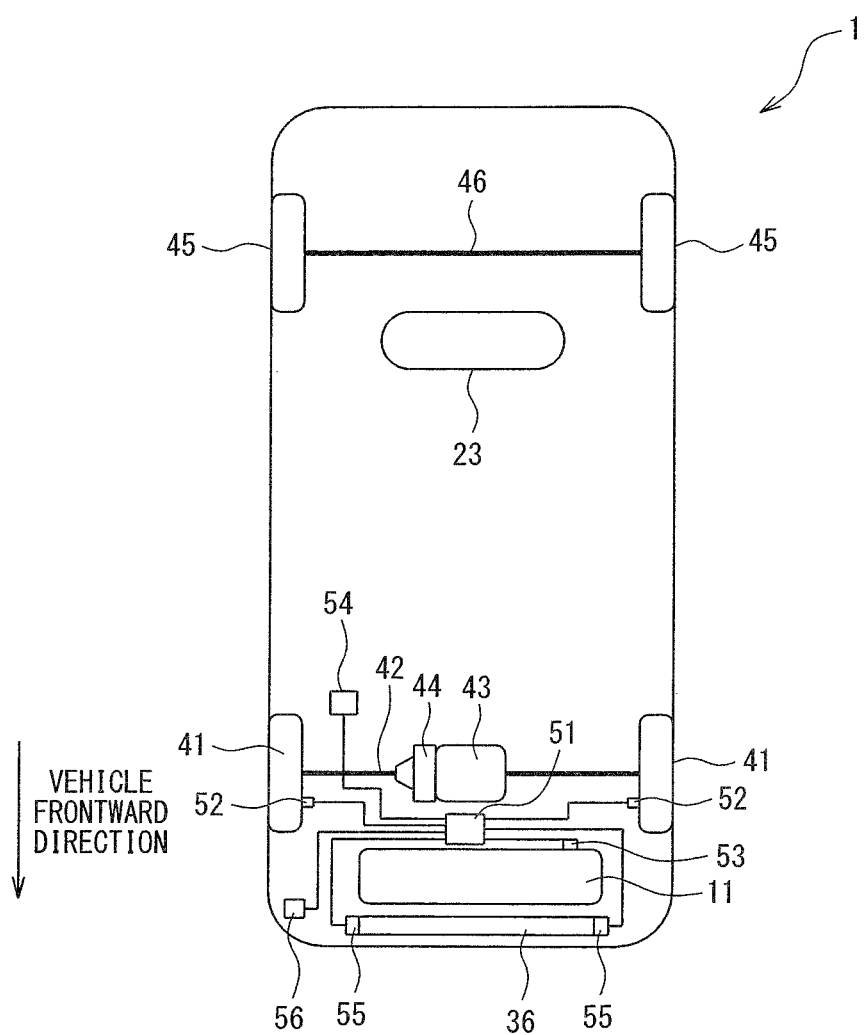
FIG. 4 is a block diagram which illustrates the layout of individual parts centered around a control system of a fuel cell-powered vehicle of an embodiment of the invention.

FIG. 1 is an explanatory view which explains a structure and an operation of a fuel battery mounted in the fuel cell-powered vehicle 1 (see FIGS. 2 to 4). Electrochemical reaction of the hydrogen fuel battery 11 and accompanying production of water will first be described below. The hydrogen fuel battery 11 constitutes a stack of a plurality of minimum structural units called cells. The structure of FIG. 1 represents one cell. In typical polymer electrolyte fuel cells, each cell is equipped with the diffusion layers 14 which supplies hydrogen and air (oxygen) and sandwiched between the anode 12 and the cathode 13, catalytic layers 15 sandwiched between the diffusion layers 14 for activating the reaction, and an electrolyte membrane 16 which is sandwiched between the catalytic layers 15 and selectively permits hydrogen ions to be transported therethrough.

A hydrogen molecule supplied to the anode 12 is changed to an active hydrogen atom in the catalytic layer 15 on an electrolyte surface of the anode 12 and then to a hydrogen ion to emit an electron. This reaction, as indicated by "1" in FIG. 1, is expressed by Eq. (1) below.

$$H_2 \rightarrow 2H^+ + 2e^- \tag{1}$$

The hydrogen ion, as generated according to Eq. (1), travels along with water from the anode 12 to the cathode 13 through the electrolyte membrane 16. The electron moves to the cathode 13 through an external circuit. An oxygen molecule in the air supplied to the cathode 13 receives the electron, as supplied from the external circuit, and then changes into an oxygen ion on the catalytic layer 15, which, in turn, reacts with the hydrogen ion moved through the electrolyte membrane 16 to produce water. This reaction, as indicated by "2" in FIG. 1, is expressed by Eq. (2) below.

$$\tfrac{1}{2}O_2 + 2H^+ \pm 2e^- \rightarrow H_2O \qquad (2)$$

A portion of the water, as produced in the above manner, is moved by the concentration diffusion toward the anode 12.

With the above chemical reaction, various losses, such as the resistance overvoltage arising from electric resistances of the electrolyte membrane 16 and the electrodes, the activation overvoltage for inducing the electrochemical reaction between the hydrogen and the oxygen, and the diffusion overvoltage for movement of the hydrogen and the oxygen through the diffusion layers 14, will occur in the fuel cell. The waste heat, as generated thereby, needs to be cooled.

FIG. 2 is a block diagram of a system of the fuel cell-powered vehicle 1 of this embodiment. The system of the fuel cell-powered vehicle 1 works to air-cool the waste heat, as generated by the fuel cells. Specifically, the hydrogen fuel battery 11 is supplied with air from the blower 22 through the filter 21. The supplied air is used not only for power generation in the hydrogen fuel battery 11, but also for absorbing the waste heat from the hydrogen fuel battery 11 to cool it. The supply of air to the hydrogen fuel battery 11 is also achieved by the wind during running of the vehicle 1 will be described later. The hydrogen in the hydrogen tank 23 is supplied to the hydrogen fuel battery 11 after being reduced in pressure by the pressure reducing valve 24. The anode exhaust leads to the cathode exhaust through the purge valve 25. The purging on the anode side is achieved by attenuating the exhaust hydrogen gas through the cathode exhaust below a lower combustible concentration limit and emitting it to the outside air.

FIG. 3 is a longitudinal sectional view of a front portion of the fuel cell-powered vehicle 1 of this embodiment. The front grille 31 formed in a top of the vehicle front portion serves as a first air inlet to take in the wind during running in front of the vehicle 1. The wind during running is drawn to the backward side of the vehicle 1 through the air intake duct 32 that is an air supply path and then supplied to the hydrogen fuel battery 11 in the fuel battery casing 33 disposed behind the air intake duct 32. The blower 22 which serves as a fan to create a flow of air to the hydrogen fuel battery 11 is disposed on the rear of the hydrogen fuel battery 11. The blower 22 may be change in the number of rotation or output power thereof under PWM control. FIG. 3 illustrates the hydrogen fuel battery 11 that is two-tiered and the blower 22 which works to produce a flow of air to the hydrogen fuel battery 11 is located behind the cover 34. The grill shutter 36 which is a regulator member is arranged between the front grille 31 and the air intake duct 32. The grille shutter 36 is capable of opening or closing the shutter members 37 and regulating the position of the shutter members 37 when opening it to control the quantity of air taken in from the front grille 31.

The air intake duct 32 has formed in a lower portion thereof the opening 38 that is a second air inlet through which the air is taken in from beneath the vehicle 1 and the flap 39 serving as an opening/closing member to open or close the opening 38. Note that a stream of air in each part of FIG. 3 is indicated by an arrow.

FIG. 4 is a block diagram which illustrates the layout of individual parts centered around a control system of the fuel cell-powered vehicle 1 of this embodiment. The driving motor 43 and the gear box 44 of a transmission are disposed on the axle 42 of the front wheels 41 that are driven wheels. The hydrogen fuel battery 11 is mounted in the front portion of the vehicle 1. The above described hydrogen tank 23 is disposed near the axle 46 of the rear wheels 45.

The control device 51 that is a control portion consisting mainly of a microcomputer and works to centrally control each part of the fuel cell-powered vehicle 1. The control device 51 is coupled to the vehicle speed sensor 52 which serves as a speed detecting portion to measure the vehicle speed, the temperature sensor 53 which serves as a temperature detecting portion to measure the temperature of the hydrogen fuel battery 11, and the rain detecting portion 54 which works to detect the rain fall. The rain detecting portion 54 may be implemented by a wiper switch which actuates vehicle wipers or a rain drop sensor which detect drops of rain. Specifically, when the wiper switch is turned on, it may be determined that it is raining now. It is, thus, possible to detect the rain fall indirectly using an on or off signal for the wiper switch. The rain drop sensor is capable of measuring the rail fall directly.

The control device 51 is coupled to the actuator 55 which opens or closes the grill shutter 36 and the actuator 56 which opens or closes the flap 39.

In the thus constructed fuel cell-powered vehicle 1, the amount of the wind during running supplied to the hydrogen fuel battery 1 can be regulated depending upon circumstances by regulating the opened position of the shutter members 37 of the grille shutter 36.

Next, the contents of the control to be executed by the control device 51 in the fuel cell-powered vehicle 1 of this embodiment will be described.

Figure 5:
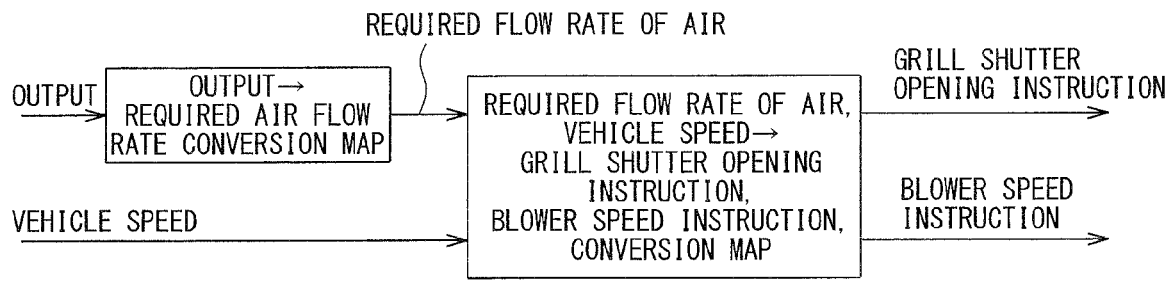
FIG. 5 is a block diagram which explains feed-forward control for a grill shutter of a fuel cell-powered vehicle of an embodiment of the invention.

FIG. 5 is a block diagram which explains the feed-forward control for the grill shutter 36. The control device 51 first determines a flow rate of air required for the hydrogen fuel battery 11 from an output of the hydrogen fuel battery 11 using a prepared conversion map. Next, a grill shutter opening instruction and a blower speed instruction are generated based on the required flow rate of air for the hydrogen fuel battery 11 and the vehicle speed measured by the vehicle speed sensor 52 using a prepared conversion map. The grill shutter opening instruction is given to the grill shutter 36. The blower speed instruction is given to the blower 22. The grill shutter opening instruction is a control signal to indicate the open position of the shutter members 37 of the grill shutter 36. The blower speed instruction is a control signal to indicate the volume of air flow from the blower 22. The conversion maps, as used here, are experimentally produced.

Figure 6:
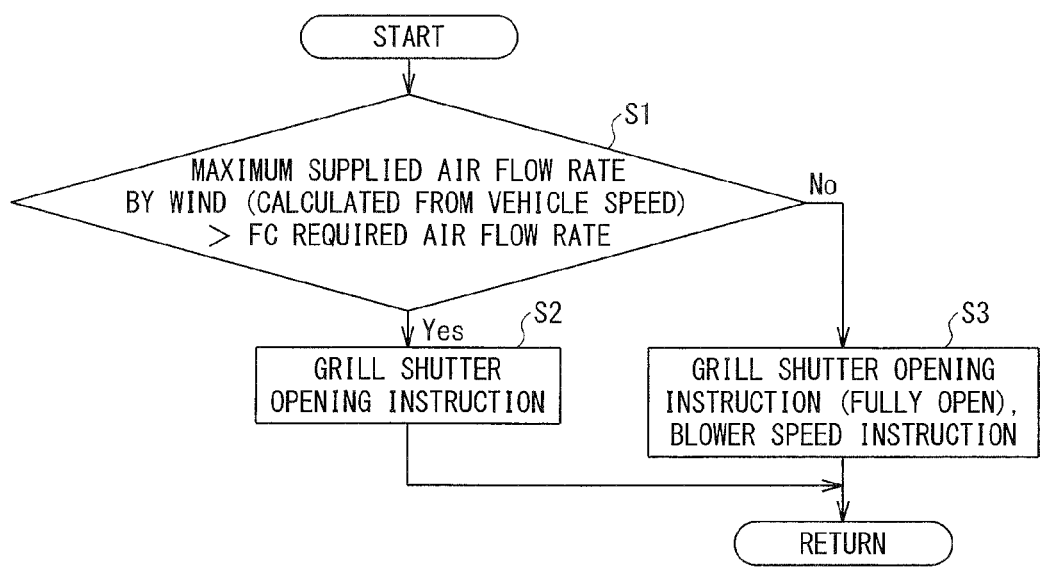
FIG. 6 is a flowchart which explains how to use a grill shutter opening instruction and a blower speed instruction in a fuel cell-powered vehicle of an embodiment of the invention.

FIG. 6 is a flowchart which explains how to use the grill shutter opening instruction and the blower speed instruction in the control of FIG. 5. The control device 51 first determines whether a maximum supplied flow rate of air, as produced by the wind during running, is greater than the required flow rate of air for the hydrogen fuel battery 11 or not (step S1). The maximum supplied flow rate of air, as produced by the wind during running, is a flow rate of air to be supplied to the hydrogen fuel battery 11 from the front grille 31 when the shutter members 37 of the grille shutter 36 are fully opened and may be calculated from the vehicle speed. If the maximum supplied flow rate of air, as produced by the wind during running, is greater than the required flow rate of air for the hydrogen fuel battery 11 (i.e., "Y" in step S1) meaning that the flow rate of air to be supplied to the hydrogen fuel battery 11 can be derived fully by winds during running, as taken in from the front grille 31, the required flow rate of air for the hydrogen fuel battery 11 is produced only by controlling the opening or closing of the shutter members 37 of the grill shutter 36 through the grill shutter opening instruction without actuating the blower 22 (step S2). Alternatively, if the maximum supplied flow rate of air, as produced by the wind during running, is less than or equal to the required flow rate of air for the hydrogen fuel battery 11 (i.e., "N" in step S1), the shutter members 37 of the grille shutter 36 are opened fully by the grill shutter opening instruction to maximize the volume of the wind during running taken in from the front grille 31. Additionally, a shortfall in the required flow rate of air for the hydrogen fuel battery 11 is compensated for by actuating the blower 22 through the blower speed instruction (step S3).

Figure 7:
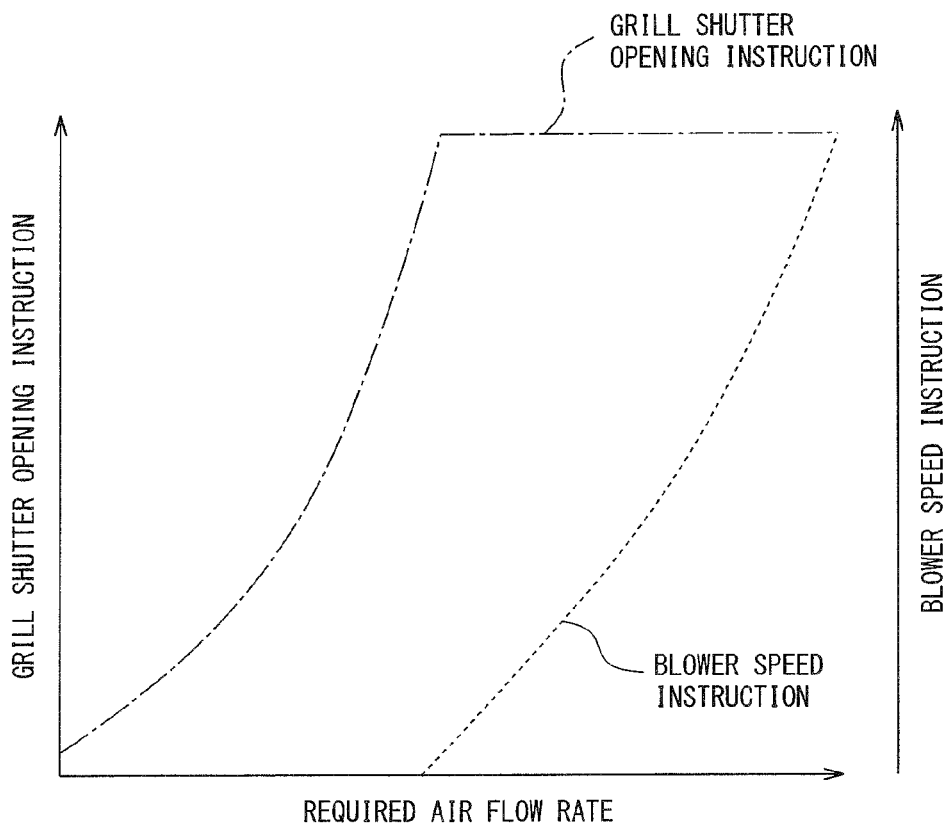
FIG. 7 is a graph which illustrates a relation among a flow rate of air required for a hydrogen fuel battery, a grill shutter opening instruction, and a blower speed instruction in a fuel cell-powered vehicle of an embodiment of the invention.

FIG. 7 is a graph which illustrates a relation among the flow rate of air required for the hydrogen fuel battery 11, the grill shutter opening instruction, and the blower speed instruction. The horizontal axis indicates the required flow rate of air. The vertical axis indicates the grill shutter opening instruction and the blower speed instruction. The degree of opening of the shutter members 37 of the grill shutter 36 is increased with increase in value of the grill shutter opening instruction. The volume of air flow produced by the blower 22 is increased with an increase in value of the blower speed instruction. When the required flow rate of air is small, it is fully satisfied by the wind during running, as taken in from the front grille 31, and thus derived only by regulating the opened position of the shutter members 37 of the grill shutter 36 through the grill shutter opening instruction. After the required flow rate of air increases, so that the shutter members 37 of the grill shutter 36 are fully opened, the volume of air flow produced by the blower 22 is increased with an increase in the required flow rate of air through the blower speed instruction while keeping the shutter members 37 opened fully.

As described above, the required flow rate of air for the hydrogen fuel battery 11 is first established by the wind during running from the front grill 31 through the adjustment of the grill shutter 36. If there is a shortfall in the required flow rate of air, the blower 22 is actuated, thus reducing the consumption of electric power.

Figure 8:
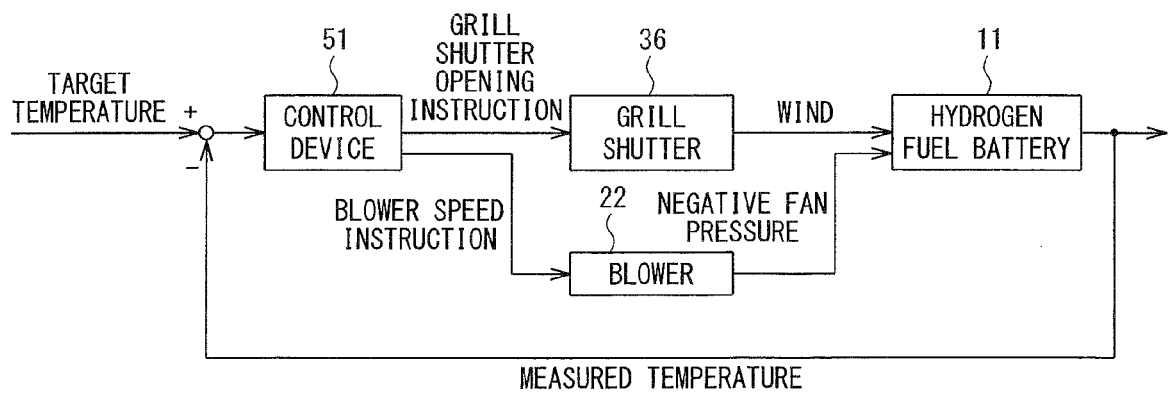
FIG. 8 is a block diagram which explains feedback control for a grill shutter and a blower of a fuel cell-powered vehicle of an embodiment of the invention.

FIG. 8 is a block diagram which explains the feedback control for the grill shutter 36 and the blower 22. The control device 51 compares the temperature of the hydrogen fuel battery 11, as measured by the temperature sensor 53, with a predetermined target temperature of the hydrogen fuel battery 11 and outputs the grill shutter opening instruction and the blower speed instruction to the grill shutter 36 and the blower 22 so as to compensate for a deviation of the measured temperature from the target temperature, thereby regulating the volume of the wind during running taken in through the grill shutter 36 and the volume of air flow produced by the blower 22 to bring the temperature of the hydrogen fuel battery 11 into agreement with the target temperature.

Figure 9:
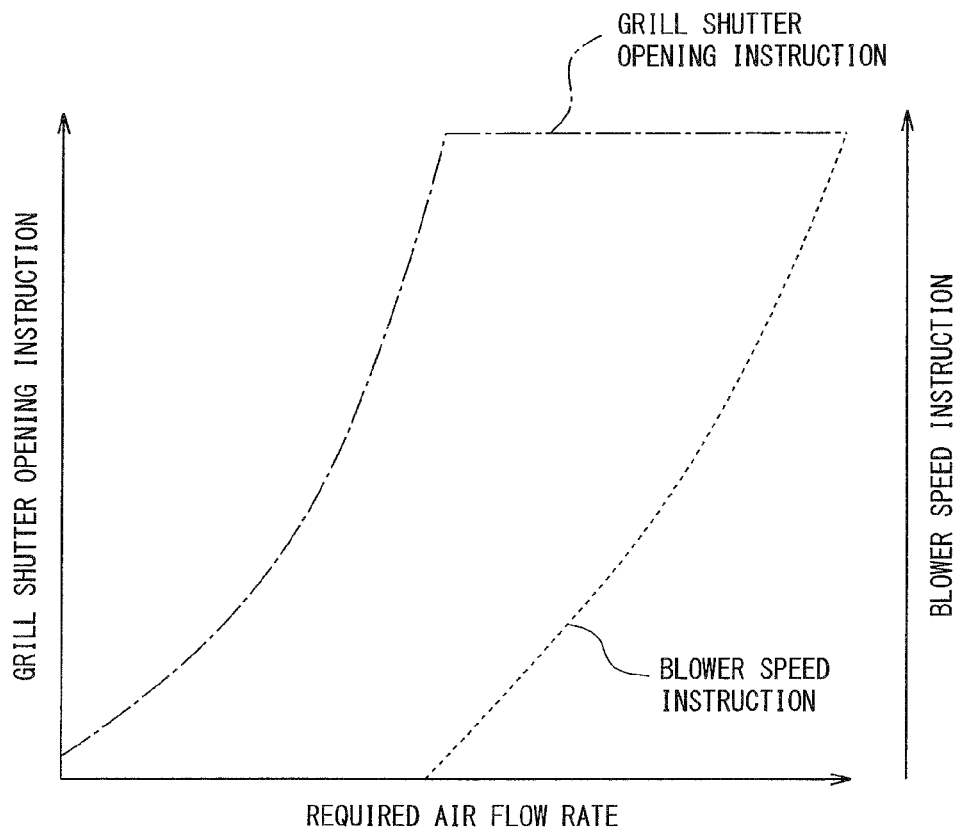
FIG. 9 is a graph which illustrates a relation among a flow rate of air required for a hydrogen fuel battery, a grill shutter opening instruction, and a blower speed instruction in a fuel cell-powered vehicle of an embodiment of the invention.

FIG. 9 is a graph which illustrates a relation among the required flow rate of air for the hydrogen fuel battery 11, the grill shutter opening instruction, and the blower speed instruction. The horizontal axis indicates the required flow rate of air. The vertical axis indicates the grill shutter opening instruction and the blower speed instruction. The degree of opening of the shutter members 37 of the grill shutter 36 is increased with increase in value of the grill shutter opening instruction. The volume of air flow produced by the blower 22 is increased with an increase in value of the blower speed instruction. In this control, when the required flow rate of air is small, it is fully produced by the wind during running, as taken in from the front grille 31, and thus derived only by regulating the opened position of the shutter members 37 of the grill shutter 36 through the grill shutter opening instruction. After the required flow rate of air increases, so that the shutter members 37 of the grill shutter 36 are fully opened, the volume of air flow produced by the blower 22 is increased with an increase in the required flow rate of air through the blower speed instruction while keeping the shutter members 37 opened fully.

With the above feedback control, the hydrogen fuel battery 11 is kept at a temperature suitable for power generation.

In this embodiment, desired controlled conditions may not be obtained only by the feed-forward control. Additionally, the feedback control may result in a delay in the control. The highly-responsive control is, thus, achieved by a combination of the feed-forward control and the feedback control.

Figure 10:
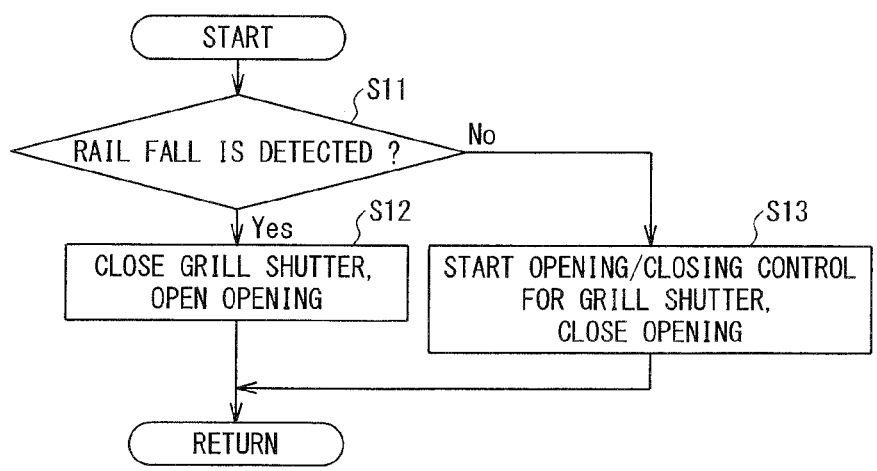
FIG. 10 is a flowchart which explains control based on a detected result by a rain detecting portion in a fuel cell-powered vehicle of an embodiment of the invention.

FIG. 10 is a flowchart which explains control based on a detected result by the rain detecting portion 54. When the rain fall is detected by the rain detecting portion 54 ("Y" in step S11), the control device 51 actuates the shutter members 37 to close the grill shutter 36 to stop supplying the wind during running to the hydrogen fuel battery 11 and also moves the flap 39 to open the opening 38 (step S12). Afterwards, when the rain fall is not detected ("N" in step S11), the opening/closing control (i.e., the control as described above referring to FIGS. 5 to 9) is commenced by driving the shutter members 37 of the grill shutter 36. Additionally, the flap 39 is actuated to close the opening 38 (step S13).

With the above control, the hydrogen fuel battery 11 is prevented from being splashed with drops of rain. Even though the shutter members 37 are closed, the air can be taken in from beneath the vehicle by opening the opening 38.

Figure 11:
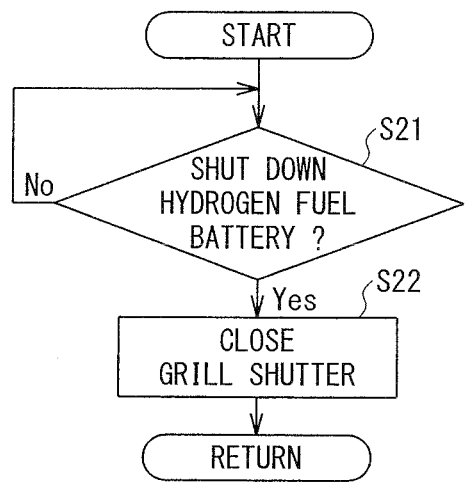
FIG. 11 is a flowchart which explains control when a hydrogen fuel battery is shut down in a fuel cell-powered vehicle of an embodiment of the invention.

FIG. 11 is a flowchart which explains control when the hydrogen fuel battery 11 is shut down. When shutting down the hydrogen fuel battery 11 (i.e., deactivating the chemical reaction in the hydrogen fuel battery 11 to stop supplying the electric power from the hydrogen fuel battery 11, "Y" in step S21), the control device 51 actuates the shutter members 37 to close the grill shutter 36 (step S22).

With the above control, the intrusion of water or foreign objects into the hydrogen fuel battery 11 is avoided after the hydrogen fuel battery 11 is shut down.

Figure 12:
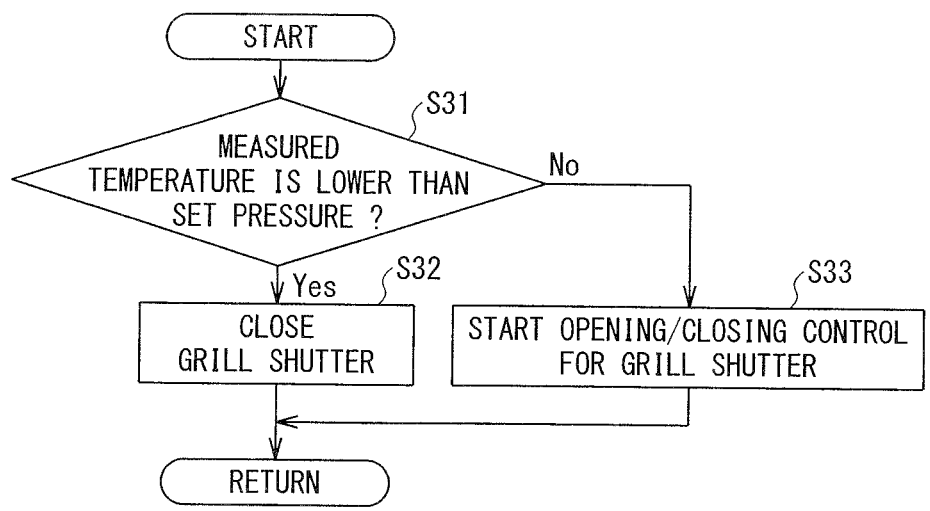
FIG. 12 is a flowchart which explains control based on a detection result by a temperature sensor in a fuel cell-powered vehicle of an embodiment of the invention.

FIG. 12 is a flowchart which explains control based on a detection result by the temperature sensor 53. When the temperature detected by the temperature sensor 53 is lower than a set temperature ("Y" in step S31), the control device 51 actuates the shutter members 37 to close the grill shutter 36 to stop supplying the wind during running to the hydrogen fuel battery 11 (step S32). Afterwards, when the temperature detected by the temperature sensor 53 exceeded the set temperature ("N" in step S31), the opening/closing control (i.e., the control as described above referring to FIGS. 5 to 9) is commenced by driving the shutter members 37 of the grill shutter 36 (step S33).

With the above control, the hydrogen fuel battery 11 is warmed up quickly, for example, at the initial stage of start of the fuel cell-powered vehicle 1.

It is indisputable that the above statements do not limit the invention. For instance, the above disclosure has referred to the four-wheel vehicle, but however, the invention may be used with two-wheel vehicles.

The invention may also be applied to cooling of secondary cells.

EXPLANATION OF REFERENCE SIGNS 11 hydrogen fuel battery
22 blower
31 front grille
32 air intake duct
36 grill shutter
38 opening
39 flap
51 control device

The invention claimed is:

1. A fuel cell cooling system for a vehicle comprising:
a first air inlet provided in a front portion of a vehicle;
an air supply path which supplies air, as taken in from said first air inlet, to a fuel cell which supplies electric power to a driving motor;
a regulating member which is provided in said air supply path and regulates an amount of air to be supplied from the air supply path to said fuel cell;
a blower which provides an air flow to said fuel cell; and
a control portion which controls said regulating member and said blower to regulate an amount of air supplied from the air supply path and the blower to the fuel cell;
a second air inlet which takes air into said air supply path from beneath the vehicle;
an opening/closing member which opens or closes said second air inlet; and
a rain detecting portion which detects rain fall,
wherein when the rain fall is detected by said rain detecting portion, said control portion stops supplying the air from said air supply path to the fuel cell through said regulating member and also opens the second air inlet through the opening/closing member.

2. A fuel cell cooling system as set forth in claim 1, further comprising a vehicle speed detecting portion which detects a speed of the vehicle, wherein said control portion works to derive a flow rate of air required for the fuel cell from an output of the fuel cell to control said regulating member based on the required flow rate of air and said vehicle speed, thereby regulating the amount of air supplied from the air supply path to the fuel cell, and wherein when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air.

3. A fuel cell cooling system as set forth in claim 1, further comprising a vehicle speed detecting portion which detects a vehicle speed and a temperature detecting portion which detects a temperature of the fuel cell, wherein said control portion works to derive a flow rate of air required for the fuel cell from an output of the fuel cell to control said regulating member based on the required flow rate of air and said vehicle speed, thereby regulating the amount of air supplied from the air supply path to the fuel cell, wherein when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air, and wherein the control portion also control the regulating member and the blower so as to eliminate a deviation of the detected temperature from a target temperature of the fuel cell.

4. A fuel cell cooling system as set forth in claim 1, wherein when the fuel cell is shut down, the control portion stops supplying the air from the air supply path to the fuel cell through the regulating member.

5. A fuel cell cooling system as set forth in claim 1, further comprising a temperature detecting portion which detects a temperature of the fuel cell, and wherein when the temperature, as detected by the temperature detecting portion, is lower than a set temperature, the control portion stops supplying the air from the air supply path to the fuel cell through the regulating member.

6. A fuel cell-powered vehicle comprising:
a driving motor;
a fuel cell which supplies electric power to the motor;
a first air inlet provided in a front portion of the vehicle;
an air supply path which supplies air, as taken in from said first air inlet, to the fuel cell;
a regulating member which is provided in said air supply path and regulates an amount of air to be supplied from the air supply path to said fuel cell;
a blower which provides an air flow to said fuel cell; and
a control portion which controls said regulating member and said blower to regulate an amount of air supplied from the air supply path and the blower to the fuel cell;
a second air inlet which takes air into said air supply path from beneath the vehicle;
an opening/closing member which opens or closes said second air inlet; and
a rain detecting portion which detects rain fall,
wherein when the rain fall is detected by said rain detecting portion, said control portion stops supplying the air from said air supply path to the fuel cell through said regulating member and also opens the second air inlet through the opening/closing member.

7. A fuel cell cooling system as set forth in claim 6, further comprising a vehicle speed detecting portion which detects a speed of the vehicle, wherein said control portion works to derive a flow rate of air required for the fuel cell from an output of the fuel cell to control said regulating member based on the required flow rate of air and said vehicle speed, thereby regulating the amount of air supplied from the air supply path to the fuel cell, and wherein when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air.

8. A fuel cell cooling system as set forth in claim 6, further comprising a vehicle speed detecting portion which detects a vehicle speed and a temperature detecting portion which detects a temperature of the fuel cell, wherein said control portion works to derive a flow rate of air required for the fuel cell from an output of the fuel cell to control said regulating member based on the required flow rate of air and said vehicle speed, thereby regulating the amount of air supplied from the air supply path to the fuel cell, wherein when the required flow rate of air is greater than a maximum air amount which is enabled to be supplied from the air supply path to the fuel cell through the regulating member, the control portion also controls the blower in addition to control of the regulating member to produce the air flow through the blower which compensates for a shortfall of air, and wherein the control portion also control the regulating member and the blower so as to eliminate a deviation of the detected temperature from a target temperature of the fuel cell.

9. A fuel cell cooling system as set forth in claim 6, wherein when the fuel cell is shut down, the control portion stops supplying the air from the air supply path to the fuel cell through the regulating member.

10. A fuel cell cooling system as set forth in claim 6, further comprising a temperature detecting portion which detects a temperature of the fuel cell, and wherein when the temperature, as detected by the temperature detecting portion, is lower than a set temperature, the control portion stops supplying the air from the air supply path to the fuel cell through the regulating member.

* * * * *